US007869647B2

(12) United States Patent
Li

(10) Patent No.: US 7,869,647 B2
(45) Date of Patent: Jan. 11, 2011

(54) SYSTEM AND METHOD FOR PROCESSING TRAINING DATA FOR A STATISTICAL APPLICATION

(75) Inventor: Jonathan Qiang Li, Mountain View, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 2025 days.

(21) Appl. No.: 10/817,660

(22) Filed: Apr. 2, 2004

(65) Prior Publication Data

US 2005/0226495 A1 Oct. 13, 2005

(51) Int. Cl.
*G06K 9/62* (2006.01)
*G06K 9/66* (2006.01)
*G06K 9/46* (2006.01)

(52) U.S. Cl. .................. 382/159; 382/190; 382/225; 382/228

(58) Field of Classification Search .......... 382/159, 382/190, 225, 228
See application file for complete search history.

(56) References Cited

U.S. PATENT DOCUMENTS

| 6,304,674 | B1 * | 10/2001 | Cass et al. ............. 382/224 |
| 6,597,800 | B1 * | 7/2003 | Murray et al. ........... 382/103 |
| 6,847,731 | B1 * | 1/2005 | Caulfield ............... 382/159 |
| 7,039,239 | B2 * | 5/2006 | Loui et al. .............. 382/225 |
| 7,194,134 | B2 * | 3/2007 | Bradshaw ............... 382/226 |
| 7,634,140 | B2 * | 12/2009 | Okajima et al. .......... 382/224 |
| 7,646,894 | B2 * | 1/2010 | Yang et al. ............. 382/115 |

OTHER PUBLICATIONS

Donoho, Andrew; Donoho David; Miriam Gasko." MacSpin:Dynmaic Graphics on a Desktop Computer", Jul. 1988, No. 4, pp. 51-56; IEEE Computer Graphics and Applications, New York, NY, USA.*
"Curve Fitting Toolbox". Jul. 2001, The Mathworks Inc. p. 2.27; Natick, MA USA.*
Haug et al. "Implementing Exploratory Spatial Data Anaylsis Methods for Multivariate Health Statisitcs", Oct. 28-30, 1997, pp. 205-213; GIS/LIS 97' Annual Conference and Exposition. Cincinnati, Ohio, USA.*
Donoho, Andrew "MacSpin:Dynamic Graphics on a Desktop Computer" IEEE Computer Graphics and Applications; Jul. 1988, No. 4, New York, NY, USA, pp. 51-58.*
Donoho A W et al: "Macspin: Dynamic Graphics on a Desktop Computer" IEEE Computer Graphics and Applications, IEEE Service Center, New York, NY, US, vol. 8, No. 4, Jul. 1, 1988 pp. 51-58, XP000049652 ISSN: 0272-1716 p. 52, col. 2, section "x-y plots", p. 53, col. 1, lines 22-24 and p. 56, lines 9-10.

(Continued)

*Primary Examiner*—Bhavesh M Mehta
*Assistant Examiner*—Mia M Thomas

(57) ABSTRACT

Representative embodiments are directed to systems and methods for processing training data for a statistical classification application. In one embodiment, confidence values are calculated for training data elements to identify the probabilities of the training data elements belonging to identified classes. An interactive scatter plot is generated using the calculated confidence values. The scatter plot visually indicates the confidence values of points in the scatter plot. Accordingly, the user is able to identify potentially misclassified training data elements. The user may select training data elements from the scatter plot and reclassify training elements as appropriate. Upon reclassification, the confidence values may be recalculated and the scatter plot revised.

26 Claims, 3 Drawing Sheets

OTHER PUBLICATIONS

Levent M Arslan et al: "Selective Training for Hidden Markov Models with Applications to Speech Classification" IEEE Transactions on Speech and Audio Processing, IEEE Service Center, New York, NY, US, vol. 7, No. 1 Jan. 1999 XP011054337 Issn: 1063-6676 p. 47, col. 2.

"Curve Fitting Toolbox" Jul. 2001, The Mathworks Inc., Natick, MA, USA, XP002395093 p. 2.27.

D. Haug et al.: "Implementing Exploratory Spatial Data Analysis Methods for Multivariate Health Statistics" Proceedings of GIS/LIS '97 Annual Conference and Exposition, (Online) Oct. 28, 1997-Oct. 30, 1997 pp. 205-213, XP002395091 Cincinnati, Ohio, USA Retrieved from the Internet URL: http://www.geovista.psu.edu/publications/GISLIS97/index.html>[retrieved on Aug. 17, 2006] section "Creating Scaleable and Linkable Scatterplots".

\* cited by examiner

Ah US 7,869,647 B2

SYSTEM AND METHOD FOR PROCESSING TRAINING DATA FOR A STATISTICAL APPLICATION

TECHNICAL FIELD

Embodiments are directed to processing training data for statistical classification applications.

BACKGROUND

Statistical classification has two widely recognized meanings. First, based upon a set of observations or data, statistical classification seeks to establish the existence of classes or clusters in the data. This type of statistical classification is referred to as unsupervised learning (or clustering). Secondly, the existence of classes may be known beforehand. In this second case, statistical classification seeks to establish a rule or rules whereby a new observation is classified into one of the known existing classes. This type of statistical classification is known as supervised learning.

Supervised learning possesses wide applicability to industrial and technical applications. For example, supervised learning may be used to establish a rule or rules for machine vision recognition. The machine vision recognition based upon the established rule(s) may be used to guide or control an automated fabrication process.

In supervised learning, a set of measurements are selected that are believed to be indicative of the defined classification(s). Training data is created based upon the selected measurements. Each element in the training data is labeled according to the defined classifications. Upon the basis of the label training data, various methodologies may be used to classify subsequently observed data elements.

The "nearest neighbor" classification methodology measures the distance (e.g., calculated using a suitable weighted metric) from an observed data element to each data element in the training data. The N-closest data elements from the training data are selected. The most frequently occurring class in the N-closest data elements is used to classify the observed data element.

The classification methodology assumes that the classifications of the training data elements are correct. However, the classifications can possess a number of errors for a variety of reasons. The amount of misclassification is related to accuracy of the classification methodology. Specifically, the greater amount of misclassification in the training data leads to reduced accuracy of the classification performance. Thus, data integrity of the classification data is an important consideration in supervised learning applications.

SUMMARY

Representative embodiments are directed to systems and methods for processing training data for a supervised learning application. In one embodiment, confidence values are calculated for training data elements to identify the probabilities of the training data elements belonging to identified classes. An interactive scatter plot is generated using the calculated confidence values. The scatter plot visually indicates the confidence values of points in the scatter plot. Accordingly, the user is able to identify potentially misclassified training data elements. The user may select training data elements from the scatter plot. In one embodiment, an image file of an object associated with the training data element is displayed upon selection of a corresponding point from the scatter plot. The user may reclassify the training data element. Alternatively, the user may delete the training data element. Upon reclassification, probabilistic models corresponding to the various classes are revised. Using the revised models, the confidence values may be recalculated and the scatter plot displayed using the recalculated confidence values.

DETAILED DESCRIPTION

Figure 1:
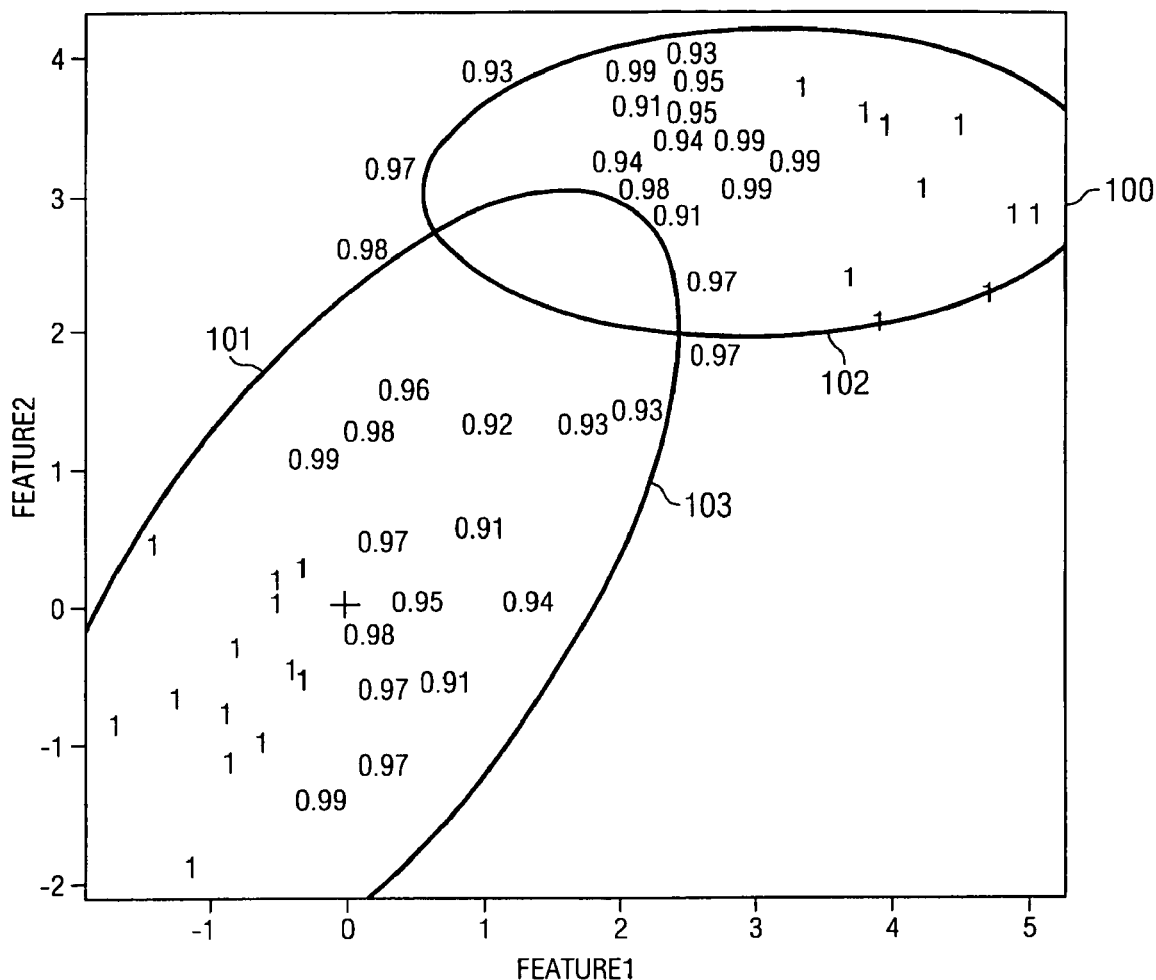
FIG. 1 depicts an interactive scatter plot according to one representative embodiment.

Referring now to the drawings, FIG. 1 depicts interactive scatter plot 100 that enables training data for a supervised learning application to be processed according to one representative embodiment. Interactive scatter plot 100 is a graphical user interface (GUI) that includes a plurality of points. Each of the points corresponds to an underlying training data structure. Each training data structure may include member variables that correspond to the features of the classification scheme (shown as FEATURES 1 and 2 in FIG. 1). Each training data structure may also include a member variable that identifies one of a plurality of classes (shown as classes 101 and 102 in FIG. 1) to which the training data structure currently belongs.

The points in interactive scatter plot 100 visually indicate the probability that the corresponding training data structures are correctly classified. For example, point 103 is shown to possess a probability of 0.13 of belonging to class 101. Because of the visual presentation of interactive scatter plot 100, a user can efficiently identify point 103 and examine the training data structure in greater detail to determine whether it is, in fact, misclassified. Other methods may be used to visually indicate the probabilities of correct classifications. For example, points possessing a probability less than a threshold value may be displayed using a predefined color.

Figure 2:
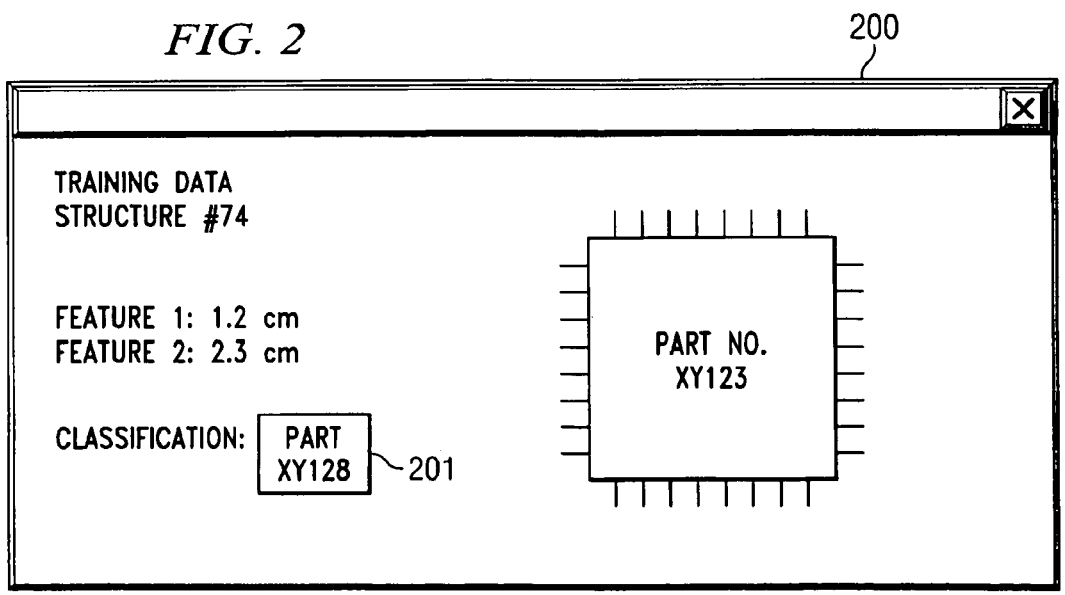
FIG. 2 depicts an image window that may be presented to a user in response to selection of a point of a scatter plot according to one representative embodiment.

In one representative embodiment, image window 200 as shown in FIG. 2 may be presented upon selection of a point from scatter plot 100 as an example. Image window 200 may depict the object from which the feature values were derived. The values of the feature elements can be presented in association with the image of the object if desired. Also, the current classification may be noted. The classification may be included within graphic user interface control 201 to enable the user to modify the classification upon visual inspection of the object. If a training data structure is manually verified or reclassified, a suitable indication may be noted within scatter plot 100 (e.g., changing the representation of the point from a "circle" to another shape). Image window 200 is by way of example only. Any suitable user interface may be employed to enable a user to verify and/or modify training data structures according to representative embodiments.

To calculate the probabilities for interactive scatter plot 100, probabilistic models are specified. The probabilistic models summarize the location and shape of the data distribution for the respective classes. By employing such models, potential errors in the training data can be identified. A number of statistical models may be employed for this purpose. The choice of a model may depend upon a number of factors such as accuracy, ease of use, speed, sample sizes, and/or the like. For example, "nonparametric models" (such as the Kernel Density Estimator) can be used to define the location and shape of a data distribution in a relatively general manner. A Gaussian mixture model can be employed (i.e., a distribution that possesses multiple Gaussian components) for distributions possessing multiple modes. Alternatively, a Gaussian distribution can be employed if a relatively low complexity model is selected.

The notation $P(x|\theta)$ may be used for the probabilistic model where x is the data value vector and $\theta$ is the model parameter vector. In a Gaussian model, $$P(x \mid \theta) = P(x \mid \mu, \Sigma) = \frac{1}{\sqrt{(2\pi)^k |\Sigma|}} \exp\left\{-\frac{1}{2}(x-\mu)^T \Sigma^{-1}(x-\mu)\right\},$$

where k is the dimension of the data (x), $\mu$ is the mean vector of length k, and $\Sigma$ is the covariance matrix of size k by k. In a two-class classification problem, two models are specified (one for each class).

After the selection of the model(s), the model parameters are estimated from the training data elements: $X_1, \ldots X_n$. In general, the training data elements X are vectors of length k: $X_i = (x_{i1}, \ldots x_{ik})^T$. In one embodiment, the model parameters are estimated from the training data elements using the Maximum Likelihood Estimation (MLE) method. For the Gaussian model, the MLE method provides reasonable estimators. The estimator for the mean is the sample mean, i.e., $\mu = (\mu_1, \ldots, \mu_k)^T$, where $$\mu_p = \frac{1}{n}\sum_{i=1}^{n} x_{ip}, \; p = 1, 2, \ldots k$$

and n is the number of training elements associated with the particular class. The estimator for the covariance matrix is given by:

$$\Sigma = \begin{pmatrix} \sigma_{11} & \sigma_{12} & \ldots & \sigma_{1k} \\ \sigma_{21} & \sigma_{22} & \ldots & \sigma_{2k} \\ \ldots & & & \\ \sigma_{k1} & \sigma_{k2} & \ldots & \sigma_{kk} \end{pmatrix},$$

where the elements of the matrix are estimated by $$\sigma_{pq} = \frac{1}{n-1}\sum_{i=1}^{n}(x_{ip}-\mu_p)(x_{iq}-\mu_q), \; p = 1, 2, \ldots k, \; q = 1, 2, \ldots, k.$$

After generating the estimators for each class, the confidence values can be computed using Bayes theorem. In this context, confidence refers to the probability of a data point belonging to its identified class. Bayes theorem provides a systematic mechanism to update such probabilities with each new training data element and/or with each reclassification of an existing training data element.

Before training data elements and, hence, measurements are available, the prior probability of a data point being within each class is 0.5. In other words, it is equally likely that a point belongs to either class. At this stage, the following notation may be employed $1_1 = P(class1) = 0.5$, $1_2 = P(class2) = 1 - 1_1 = 0.5$. Once a measurement is made (a training data element is defined), the probabilistic models for the classes can be specified or revised by estimating the parameters of the models using the respective training data element. Let $P(X|class1) = P(X|\theta_1)$, $P(X|class2) = P(X|\theta_2)$, where X represents the respective training data element, $\theta_1$ refers to the model estimators of the first class, and $\theta_2$ refers to the model estimators of the second class.

Bayes theorem relates the conditional probability of one event given another event with the joint probability of the two events as follows:

$$1_1^{update} = P(class1 \mid X)$$
$$= \frac{P(X \mid class1)P(class1)}{P(X)}$$
$$= \frac{P(X \mid class1)P(class1)}{P(X \mid class1)P(class1) + P(X \mid class2)P(class2)},$$
$$= \frac{P_1(X \mid \theta_1)1_1}{P_1(X \mid \theta_1)1_1 + P_2(X \mid \theta_2)1_2}, \text{ and}$$
$$1_2^{update} = 1 - 1_1^{updated}.$$

Thus, an iterative methodology may be employed that refines the class probabilities based upon the prior stage class probabilities. Accordingly, the iterative methodology enables the confidence values to be refined by the addition or modification of training data elements. Also, Bayes theorem can be applied to both univariate or multivariate models. A multivariate model refers to a model in which multiple feature elements are employed to characterize training data elements. If a multivariate model is employed, the features may be assumed to be statistically independent.

Figure 3:
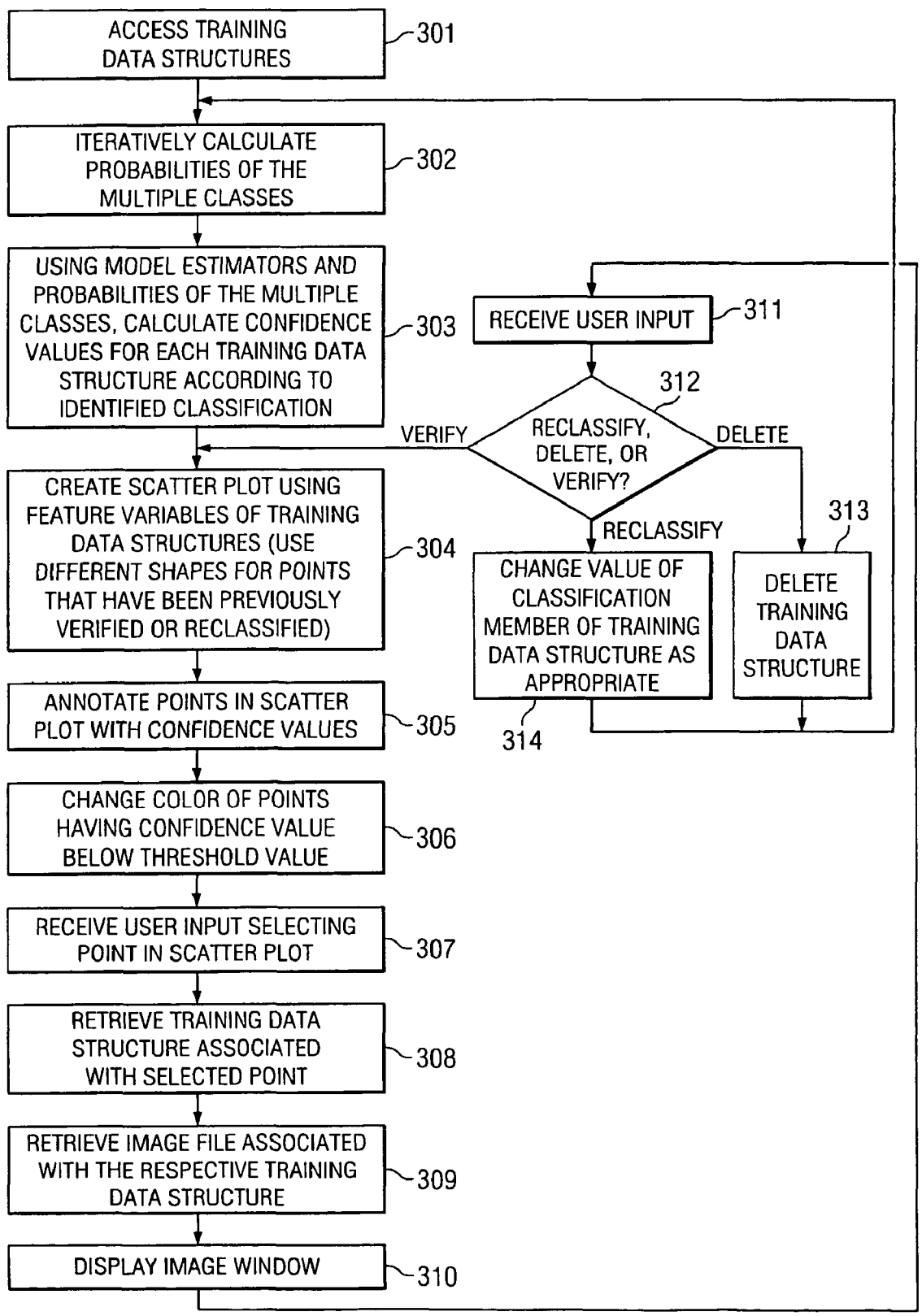
FIG. 3 depicts a flowchart for processing training data using an interactive scatter plot according to one representative embodiment.

FIG. 3 depicts a flowchart for processing training data structures for a statistical learning application using an interactive scatter plot according to one representative embodiment. The process flow of FIG. 3 may be implemented as software instructions executed by a suitable processor system.

In step 301 of FIG. 3, the training data structures are retrieved from memory (e.g., a suitable storage peripheral). Each training data structure may include one or several feature variables or members. The feature members may store the values associated with the measurements. Each training data structure may include a classification variable or member to identify the class to which the training data structure has been assigned.

In step 302, the probabilities of the multiple classes are iteratively calculated. In step 303, using the class probabilities and the model estimators, a confidence value is calculated for each training data structure. The confidence value is the probability that the respective training data structure belongs to its identified class. As previously noted, a variety of probabilistic models can be employed depending upon the particular application. Additionally, the probabilistic models can be univariate or multivariate.

In step 304, a scatter plot is created using the feature variables of the training data structures. In one embodiment, different shapes may be used for points depending upon whether the points have been previously verified or reclassified by the user. In step 305, points in the scatter plot may be annotated with the calculated confidence values. In step 306, points in the scatter plot may be changed according to confidence values falling below a threshold value. The threshold value may be manually set by the user if desired. In step 307, user input is received to select a point from the scatter plot.

In step 308, the training data structure associated with the selected point is retrieved. In step 309, the image file associated with the respective training data structure is retrieved. In step 310, an image window is displayed. In step 311, additional user input is received to verify the current classification, modify the classification, or delete the training data structure. In step 312, a logical comparison is made based upon the user input. If the user verified the current classification, the process flow returns to step 304. If the user selected the delete option, the process flow proceeds to step 313 where the delete operation is performed. If the user selected the modify option, the process flow proceeds to step 314 where the classification member is changed according to the user input.

From either step 313 or step 314, the process flow returns to step 302 to revise the class probabilities based upon the deletion or modification. Steps 303-306 are also repeated thereby presenting a revised scatter plot to the user. Specifically, because the training data was corrupted by a suspect classification, the revision enables the model estimates to be made more accurate. The improved accuracy of the model estimates also enables the confidence values to be calculated more accurately. Thus, it is seen that an iterative process occurs that enables the user to efficiently verify the classifications of a set of training data.

Figure 4:
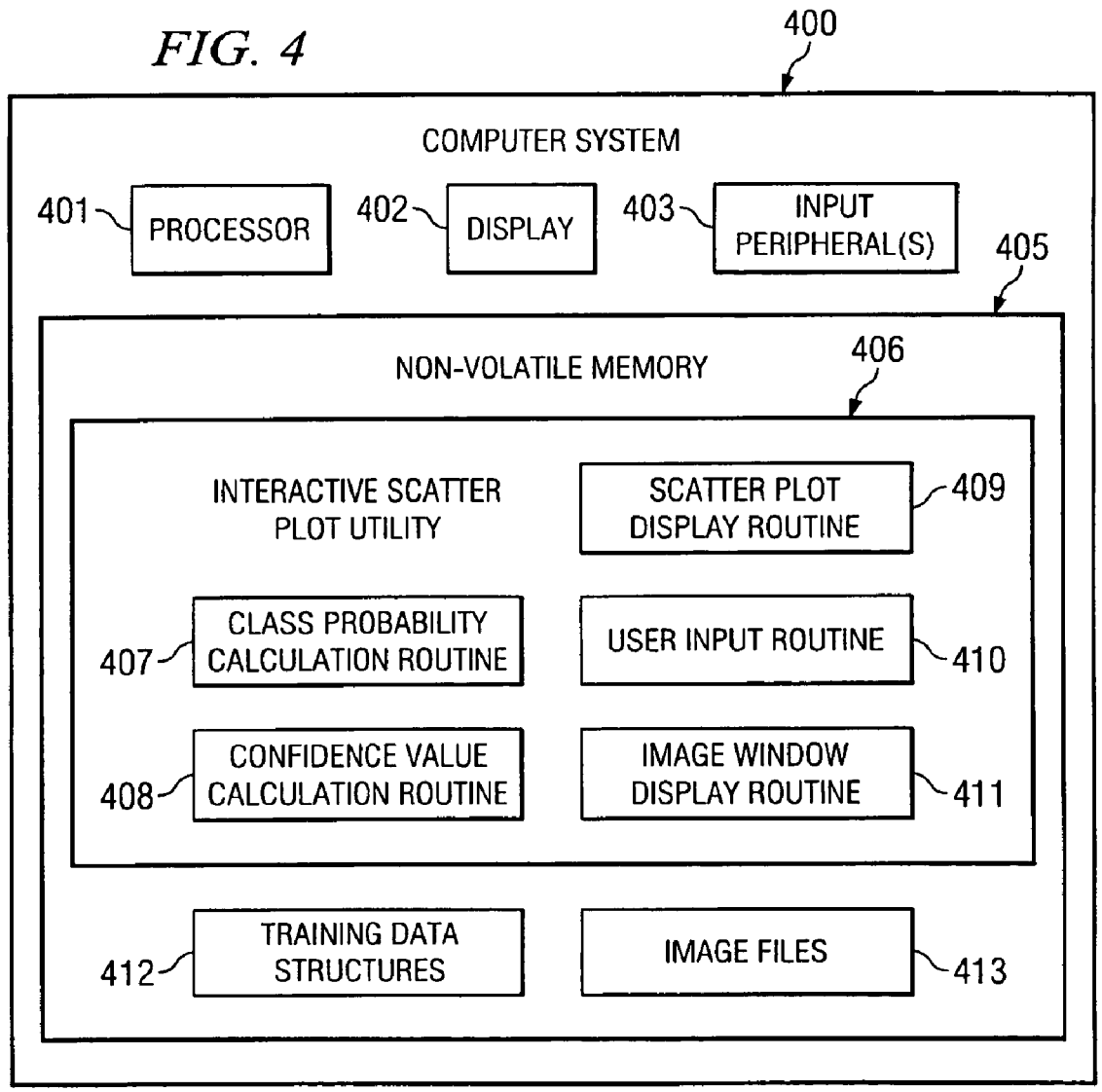
FIG. 4 depicts a computer system that implements an interactive scatter plot utility according to one representative embodiment.

FIG. 4 depicts computer system 400 that may be used to execute interactive scatter plot utility 406 according to one representative embodiment. Computer system 400 includes typical processing resources such as processor 401, display 402, input peripheral(s) 403, and non-volatile memory 405. Non-volatile memory 405 (which may be implemented using any suitable computer readable medium) stores the executable software code defining interactive scatter plot utility 406. Interactive scatter plot utility 406 may be implemented using the flowchart described with respect to FIG. 3 as an example. Interactive scatter plot utility 406 may be organized according to a number of routines, functions, code segments, and/or the like. As shown in FIG. 4, interactive scatter plot 406 includes class probability calculation routine 407, confidence value calculation routine 408, scatter plot display routine 409, user input routine 410, and image window display routine 411. Interactive scatter plot utility 406 may access various data stored within non-volatile memory 405 such as training data structures 412 and image files 413.

Representative embodiments enable a user to efficiently process training data. By visually identifying training data elements that possess relatively low confidence values, the user's attention may be brought to suspect training data in a relatively quick manner. Moreover, by enabling the user to access the underlying training data and/or image files, the user can verify, reclassify, or delete training data elements as appropriate. In response to such user input, confidence values may be recalculated and the scatter plot can be redisplayed using the more accurately calculated confidence values.

What is claimed is:

1. A non-transitory computer readable medium including executable instructions for processing training data for a statistical classification application, said computer readable medium comprising:

code for retrieving a plurality of training data structures that each comprise data members corresponding to feature elements and a data member identifying one of a plurality of classes;

code for processing each of said plurality of training data structures using probabilistic models that are a function of said feature elements to calculate a respective probability indicative of the respective training data structure belonging to its identified class; and code for generating a scatter plot, using said plurality of training data structures, that visually indicates probabilities of said training data structures belonging to identified classes.

2. The non-transitory computer readable medium of claim 1 further comprising:

code for annotating points in said scatter plot to indicate probabilities of said plurality of training data structures belonging to identified classes.

3. The non-transitory computer readable medium of claim 1, wherein said code for generating a scatter plot displays points in said scatter plot using a predetermined color to indicate training data structures having probabilities below a threshold value.

4. The non-transitory computer readable medium of claim 1 further comprising:

code for identifying regions of said scatter plot that correspond to said plurality of classes.

5. The non-transitory computer readable medium of claim 1 further comprising:

code for receiving first input from a user to select a point corresponding to a respective training data structure.

6. The non-transitory computer readable medium of claim 5 further comprising:

code for displaying values of feature elements of said respective training data structure corresponding to said selected point.

7. The non-transitory computer readable medium of claim 5 further comprising:

code for displaying an image file associated with an object from which feature elements were derived in response to said code for receiving first input.

8. The non-transitory computer readable medium of claim 5 further comprising:

code for receiving second input from said user to reclassify said respective training data structure corresponding to said selected point.

9. The non-transitory computer readable medium of claim 8 further comprising:

code for revising said probabilistic models in response to said code for receiving said second input, wherein said code for processing is operable to recalculate probabilities of said plurality of training data structures belonging to identified classes using said revised probabilistic models.

10. The non-transitory computer readable medium of claim 5 further comprising:

code for receiving second input from said user to delete said respective training data structure corresponding to said selected point.

11. A method for processing training data for a statistical classification application, the method comprising:

accessing a plurality of training data structures wherein each training data structure includes a plurality of feature variables and a variable identifying one of a plurality of classes;

calculating a respective confidence value for each of said plurality of training data structures that is indicative of a probability of the respective training data structure belonging to its identified class; and generating a graphical user interface for a scatter plot that visually indicates confidence values for said plurality of training data structures.

12. The method of claim 11 further comprising:
annotating at least a subset of points in said scatter plot with said confidence values.

13. The method of claim 11 wherein visually indicating the confidence values for the plurality of training data structures comprises using a predetermined color to identify training data structures associated with a confidence value below a threshold value.

14. The method of claim 13 wherein said threshold value is determined by receiving input from a user.

15. The method of claim 13 wherein said graphical user interface identifies regions of said scatter plot associated with each of said plurality of classes.

16. The method of claim 13 further comprising:
receiving user input to select a point of said scatter plot.

17. The method of claim 16 further comprising:
displaying values of feature element variables of a training data structure corresponding to said selected point.

18. The method of claim 16 further comprising:
displaying an image file associated with an object from which values, of a plurality of feature variables corresponding to said selected point, were obtained.

19. The method of claim 16 further comprising:
deleting said training data structure corresponding to said selected point in response to further user input.

20. The method of claim 16 further comprising:
reclassifying said training data structure corresponding to said selected point in response to further user input.

21. The method of claim 11 further comprising:
refining probabilistic models after reclassification of at least one of said plurality of training data structures by a user; and repeating said calculating and displaying in response to said refining.

22. A system for processing training data for a statistical classification application, the system comprising:
means for processing a plurality of training data structures to generate a plurality of confidence values, wherein said each of said plurality of training data structures defines feature values and identifies one of a plurality of classes, wherein said confidence values indicate probabilities of objects having said feature values belonging to said identified classes; and means for displaying a scatter plot using said plurality of training data structures that provides visual indication of probabilities of points belonging to identified classes.

23. The system of claim 22 further comprising:
means for annotating points in said scatter plot to indicate probabilities of said plurality of training data structure belonging to identified classes.

24. The system of claim 22 further comprising: means for receiving first user input to select a point in said scatter plot.

25. The system of claim 24 further comprising:
means for receiving second user input to reclassify a training data structure corresponding to said selected scatter point.

26. The system of claim 25 further comprising:
means for revising probabilistic models associated with said plurality of classes, wherein said means for processing reprocesses said plurality of training data structures in response to said means for revising and said means for displaying redisplays said scatter plot using revised probabilities from said means for processing.

* * * * *

UNITED STATES PATENT AND TRADEMARK OFFICE
CERTIFICATE OF CORRECTION

PATENT NO. : 7,869,647 B2  
APPLICATION NO. : 10/817660  
DATED : January 11, 2011  
INVENTOR(S) : Jonathan Qiang Li Page 1 of 1

It is certified that error appears in the above-identified patent and that said Letters Patent is hereby corrected as shown below:

On the title page, in field (56), under "Other Publications", in column 2, line 2, delete "Dynmaic" and insert -- Dynamic --, therefor.

On the title page, in field (56), under "Other Publications", in column 2, line 7, delete "Anaylsis" and insert -- Analysis --, therefor.

On the title page, in field (56), under "Other Publications", in column 2, line 8, delete "Statisitcs"," and insert -- Statistics", --, therefor.

Signed and Sealed this  
Twelfth Day of April, 2011

David J. Kappos  
*Director of the United States Patent and Trademark Office*